United States Patent [19]
Chester

[11] 4,313,520
[45] Feb. 2, 1982

[54] AUTOMOBILE IGNITION CIRCUIT CLOSING DEVICE

[76] Inventor: Lowell G. Chester, 713 Trancas St. #10, Napa, Calif. 94558

[21] Appl. No.: 40,842

[22] Filed: May 21, 1979

[51] Int. Cl.³ .................... B60R 25/04; H01H 27/00; B60R 16/04
[52] U.S. Cl. ..................... 180/287; 70/237; 70/252; 123/146.5 B; 200/44; 200/61.54; 307/10 R
[58] Field of Search ................ 200/61.54, 44; 70/252, 70/237, 239; 123/146.5 B; 180/287, 78; 307/10 R

[56] References Cited

U.S. PATENT DOCUMENTS

| 1,126,262 | 1/1915 | Nichols | 70/252 |
| 1,213,811 | 1/1917 | Smith | 200/61.54 |
| 3,145,700 | 8/1964 | Root | 307/10 R X |
| 3,192,395 | 6/1965 | Langlois | 307/10 R |

Primary Examiner—Joseph F. Peters, Jr.
Assistant Examiner—Milton L. Smith
Attorney, Agent, or Firm—Bielen and Peterson

[57] ABSTRACT

A device for closing the ignition circuit of a vehicle or automobile thus permitting the starting of the motor. The device employs a pair of key operated locking ignition switches located on either side of the steering column. A source of electrical energy connects to the pair of switches and travels to the ignition circuit of an automobile.

3 Claims, 3 Drawing Figures

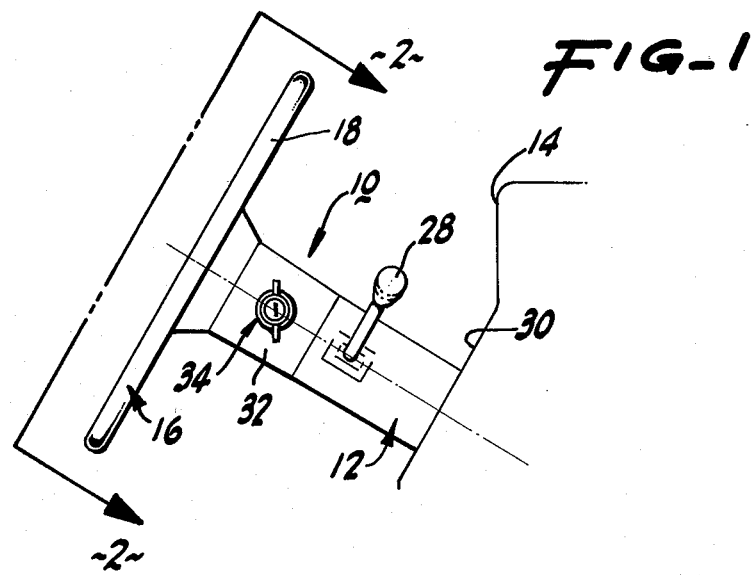
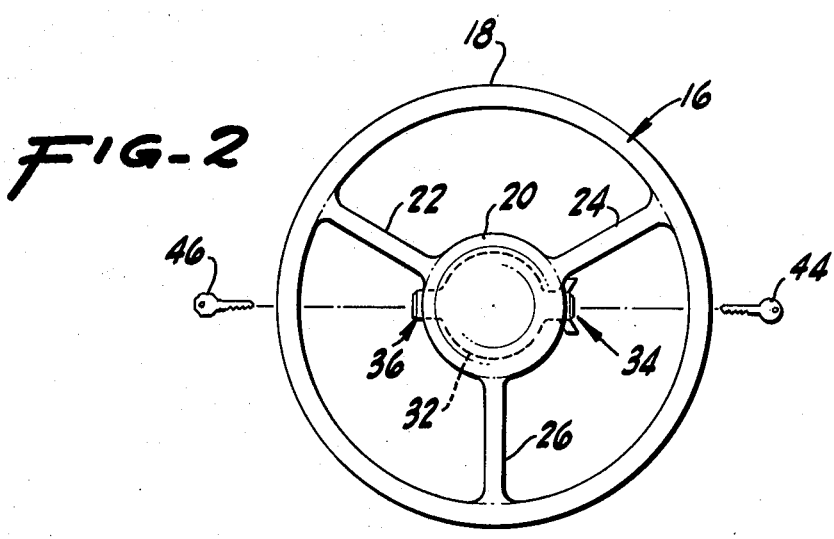
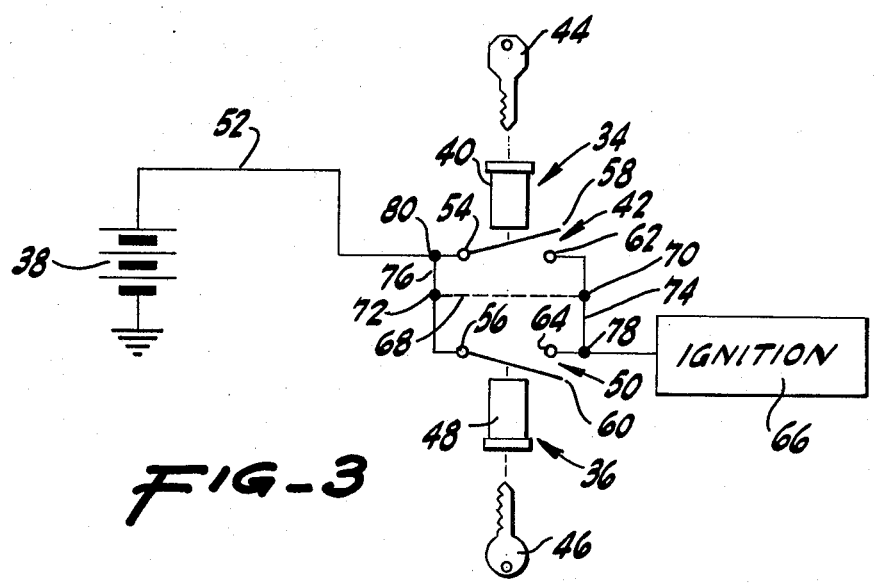

AUTOMOBILE IGNITION CIRCUIT CLOSING DEVICE

BACKGROUND OF THE INVENTION

The present invention relates to a novel automobile ignition circuit closing device.

The internal combustion engine foresaw the advent of motor vehicles such as automobiles. Automobiles have greatly increased the scope of commercial and private enterprises in the modern world. However, it is a continuing problem to control the starting and stopping of automobiles. Early in the development of the automobile an electrical system was instigated and quickly replaced mechanical cranking of the engine.

In recent years automobile ignition circuits used in conjunction with key operated locks prevent casual starting of automobiles and employment of the steering system of the same through a locked steering column. Such innovations have moved many ignition locks to the steering column of an automobile. Unfortunately it is difficult for many persons to insert a key into the ignition lock because of its inconvenient location.

Prior knowledge in this field includes U.S. Pat. No. 3,373,312 to Conn which describes a dash board mounted ignition switch. U.S. Pat. No. 3,576,530 to Buechler, and U.S. Pat. No. 1,624,828 to Caminita describe various dual turn signal devices. None of the prior art teaches the device of the present application.

A new ignition locking system conveniently located is needed to aid certain persons in operating an automobile.

SUMMARY OF THE INVENTION

In accordance with the present invention a novel and useful automobile ignition circuit closing device is provided.

The device of the present invention utilizes the steering column of an automobile, in particular the portion of the same which is located within the cab of the vehicle. A first key operated locking ignition switch is located on one side of the steering column portion within the cab of the vehicle. Likewise, a second key operated locking ignition device is located on the other side of the steering column. A source of electrical energy such as a battery, generator or the like, provides the motive force for the ignition circuit. The first and second key operated ignition switches are connected in parallel or series with respect to the source of electrical energy and the existing ignition circuit of the automobile.

The device of the present invention may be employed in conjunction with existing steering column locking mechanisms as well as various types of auxilliary electrical contols now found on automobiles.

It may be apparent that a novel and useful device for use in automobiles has been described.

It is an object of the present invention to provide an automobile ignition circuit closing device which offers the convenience of inserting a key to start an automobile from either the left or right side of the steering column.

It is another object of the present invention to provide an ignition circuit closing device which is an aid to disabled persons, left handed persons, or other persons in which one hand is occupied during the process of starting an automobile.

It is still another object of the present invention to provide an automobile ignition circuit closing device which simplifies the starting and stopping of an automobile.

Another object of the present invention is to provide an automobile ignition circuit closing device which requires the use of two separate keys to start the same.

The device of the present invention possesses other objects and advantages especially those which concern particular characteristics and features thereof which will become apparent as the specificaton continues.

BRIEF DESCRIPTION OF THE DRAWINGS

FIG. 1 is a side elevational view of the device in place within the cab of an automobile.

FIG. 2 is a view taken along line 2—2 of FIG. 1.

FIG. 3 is a schematic view depicting two embodiments of the present device.

For a better understanding of the invention, reference is made to the following detailed description.

DESCRIPTION OF THE PREFERRED EMBODIMENTS

Various aspects of the present invention will evolve from the following detailed description of the preferred embodiments thereof which should be taken in conjunction with the heretofore described drawings.

With reference to the drawings the device as a whole is denoted by reference character 10 and includes as one of its elements a steering column 12. As shown in FIG. 1, steering column 12 emerges from fire wall 14 into the cab of a typical automobile. Therefore, it should be noted that only a portion of steering column 12 is shown. Steering column 12 includes at its terminus a steering wheel 16 having a outer annulus 18 which is connected to a hub 20 via spokes 22, 24, and 26. A directional signal lever 28 is fixed toward the dash board 30, FIGS. 1 and 2.

Within section 32 of steering column 12 is found a first key operated locking ignition switch 34. Opposite switch 34 is found a second key operated locking ignition switch 36. Switches 34 and 36 may be of the type of ignition switches now employed in automobiles.

Turning to FIG. 3, it may be seen that a source of electrical energy 38 such as the battery, generator, alternator, or the like now found in an automobile is electrically connected to switches 34 and 36. Switch 34 includes a cylinder 40 and schematically illustrated switch 42. Key 44 is intended to operate ignition locking switch 34. Likewise, key 46 is intended to operate ignition locking switch 36 which includes cylinder 48 and schematically illustrated switch 50.

If convenience is desired, wherein the automobile may be started by insertion of a key on either side of steering column 12, key 44 and key 46 would be identical. In such a case, ignition locking switches 34 and 36 would be connected in parallel. Electrical energy would travel from source 38 through leg 52 to terminal 80 to terminals 54 and 56. Contact arms 58 or 60 would then make contact with terminals 62 or 64. Thus, electricity would flow from source 38 to the ignition circuit 66 to start the automobile.

If for security or authority reasons it is desirous that two keys be employed to start the automobile, keys 44 and 46 would be patterened different from one another such that key 44 could only fit ignition locking switch 34 and key 46 could only fit ignition locking switch 36. In such a case leg 68 (shown as dashed line) would connect terminals 70 and 72. Leg 74, between terminals 70 and 78, and leg 76, between terminals 72 and 80 are removed from the circuit. Thus, electrical energy would be required to flow through key operated ignition locking switch 34 before flowing through key operated ignition locking switch 36.

In operation the user merely inserts key 44 or key 46 into switches 34 or 36 when they are connected electrically and parallel. When switches 34 and 36 are connected in series the user inserts keys 44 and 46 into switches 34 and 36 respectively. The remaining circuitry and ignition circuit 66 may be identical to those existing on automobiles such that the pressing of a button or turning of either key may start the automobile.

While in the foregoing specification embodiments of the invention have been set forth in considerable detail for the purposes of making a complete disclosure of the invention, it will be apparent to those of ordinary skill in the art that numerous changes may be made in such details without departing from the spirit and principles of the invention.

What is claimed is:

1. A vehicle ignition circuit closing device for a vehicle having a steering column with a portion of the steering column located in the cab of the vehicle comprising:
   a. first key operated locking ignition switch being located on one side of the steering column portion within the cab of the vehicle;
   b. second key operated locking ignition switch being located on the other side of the steering column within the cab of the vehicle, said first and second key operated locking ignition switches including first and second key openings which are located on said one and another side of the steering column respectively;
   c. source of electrical energy, said first and second key operated ignition switches being electrically connected in parallel to said source of electrical energy and to the ignition circuit of an automobile.

2. A vehicle ingition circuit closing device for a vehicle having a steering column with a portion of the steering column located in the cab of the vehicle comprising:
   a. first key operated locking ignition switch being located on one side of the steering column portion within the cab of the vehicle;
   b. second key operated locking ignition switch being located on the other side of the steering column within the cab of the vehicle, said first and second key operated locking ignition switches including first and second key openings which are located on said one and another side of the steering column respectively;
   c. source of electrical energy, said first and second key operated ignition switches being electrically connected in series to said source of electrical energy and to the ignition circuit of an automobile.

3. The device of claim 1 or 2 in which said key operated ignition switches are separated from one another by one hundred and eighty degrees of arc.

* * * * *